(12) United States Patent
Clarke

(10) Patent No.: US 8,567,083 B2
(45) Date of Patent: Oct. 29, 2013

(54) JUNCTION BOX LOCATOR

(76) Inventor: Graham Clarke, West Kelowna (CA)

( * ) Notice: Subject to any disclaimer, the term of this patent is extended or adjusted under 35 U.S.C. 154(b) by 96 days.

(21) Appl. No.: 12/930,426

(22) Filed: Jan. 7, 2011

(65) Prior Publication Data

US 2012/0174425 A1    Jul. 12, 2012

(51) Int. Cl.
*G01B 3/14* (2006.01)
*G01B 7/00* (2006.01)
*B25H 7/00* (2006.01)

(52) U.S. Cl.
USPC ............... 33/528; 33/DIG. 1; 33/DIG. 10

(58) Field of Classification Search
USPC ................. 33/528, DIG. 1, DIG. 10
See application file for complete search history.

(56) References Cited

U.S. PATENT DOCUMENTS

| | | | | |
|---|---|---|---|---|
| 3,845,384 A | * | 10/1974 | Stoutenberg et al. | 324/228 |
| 3,940,857 A | * | 3/1976 | Giordano | 33/528 |
| 3,943,631 A | * | 3/1976 | Smugor | 33/528 |
| 4,384,396 A | * | 5/1983 | Smolik | 29/407.09 |
| 5,148,108 A | * | 9/1992 | Dufour | 324/226 |
| 5,157,844 A | * | 10/1992 | Mallison et al. | 33/528 |
| 6,101,731 A | * | 8/2000 | Mesa | 33/528 |
| 6,452,097 B1 | * | 9/2002 | DeWall | 174/58 |
| 6,708,421 B1 | * | 3/2004 | Crorey | 33/613 |
| 7,661,201 B1 | * | 2/2010 | Hordis | 33/528 |
| 7,926,195 B2 | * | 4/2011 | Crorey | 33/528 |

FOREIGN PATENT DOCUMENTS

EP          416162 A1 *  3/1991

* cited by examiner

*Primary Examiner* — Christopher Fulton

(57) ABSTRACT

A locating device to find all hidden utility outlets such as electrical boxes after a wall covering such as gypsum board has been placed there over. The apparatus in one embodiment includes a first body locatable within a junction box proximate a rear surface of a wall covering, said first body having a magnet located therein. A second body locatable proximate a front surface of the wall covering opposite the first body. The second body includes scribing points to mark an indent on the surface of the said wall covering. The apparatus further comprises an elongate member having proximate and distal ends and being pivotally mounted to the second body. The elongate member has a second magnet at the proximate end thereof wherein the distal end is alignable with an alignment indicator when the scribing points on the second body are aligned with the entry point for a cutting tool.

12 Claims, 4 Drawing Sheets

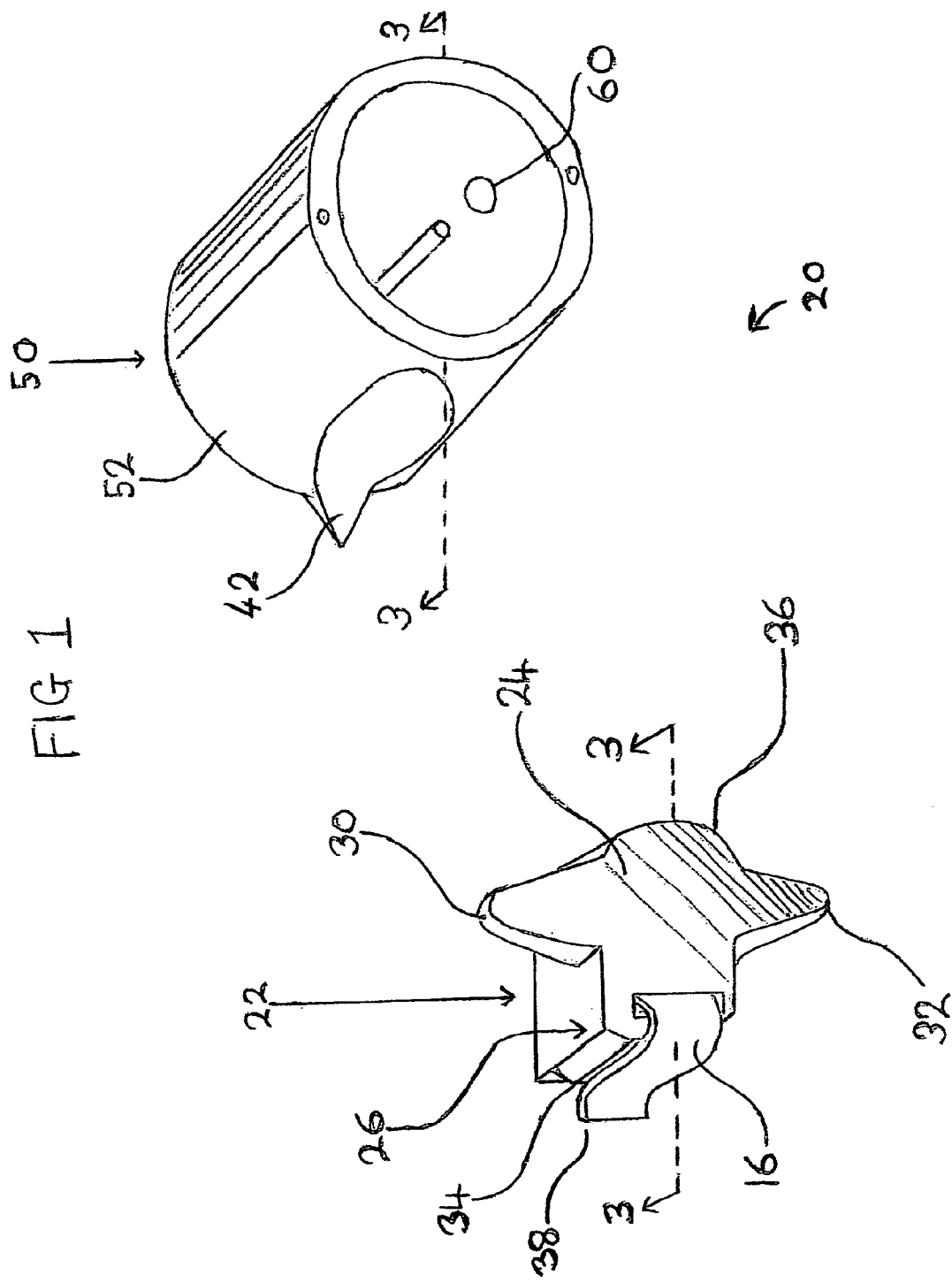

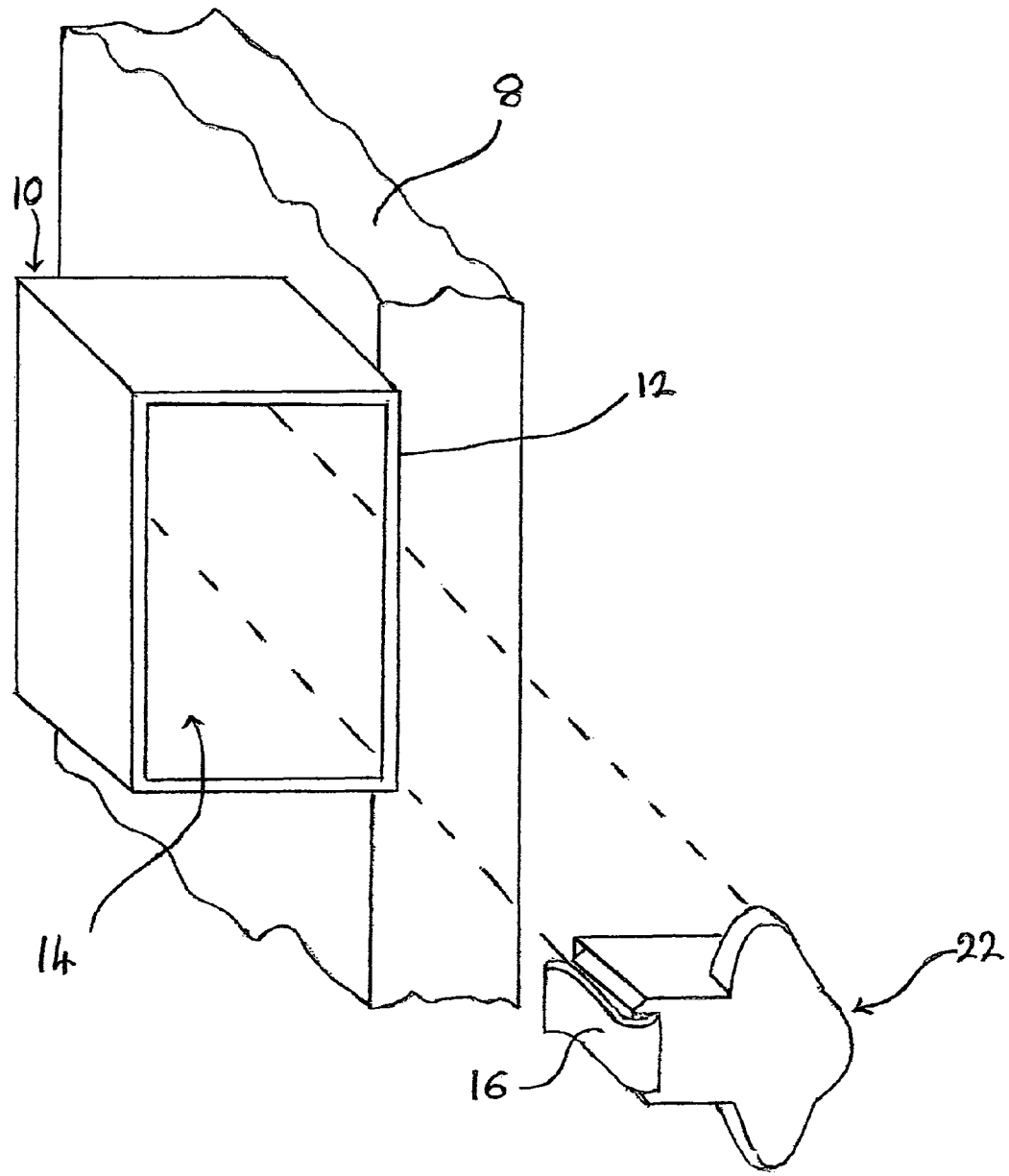

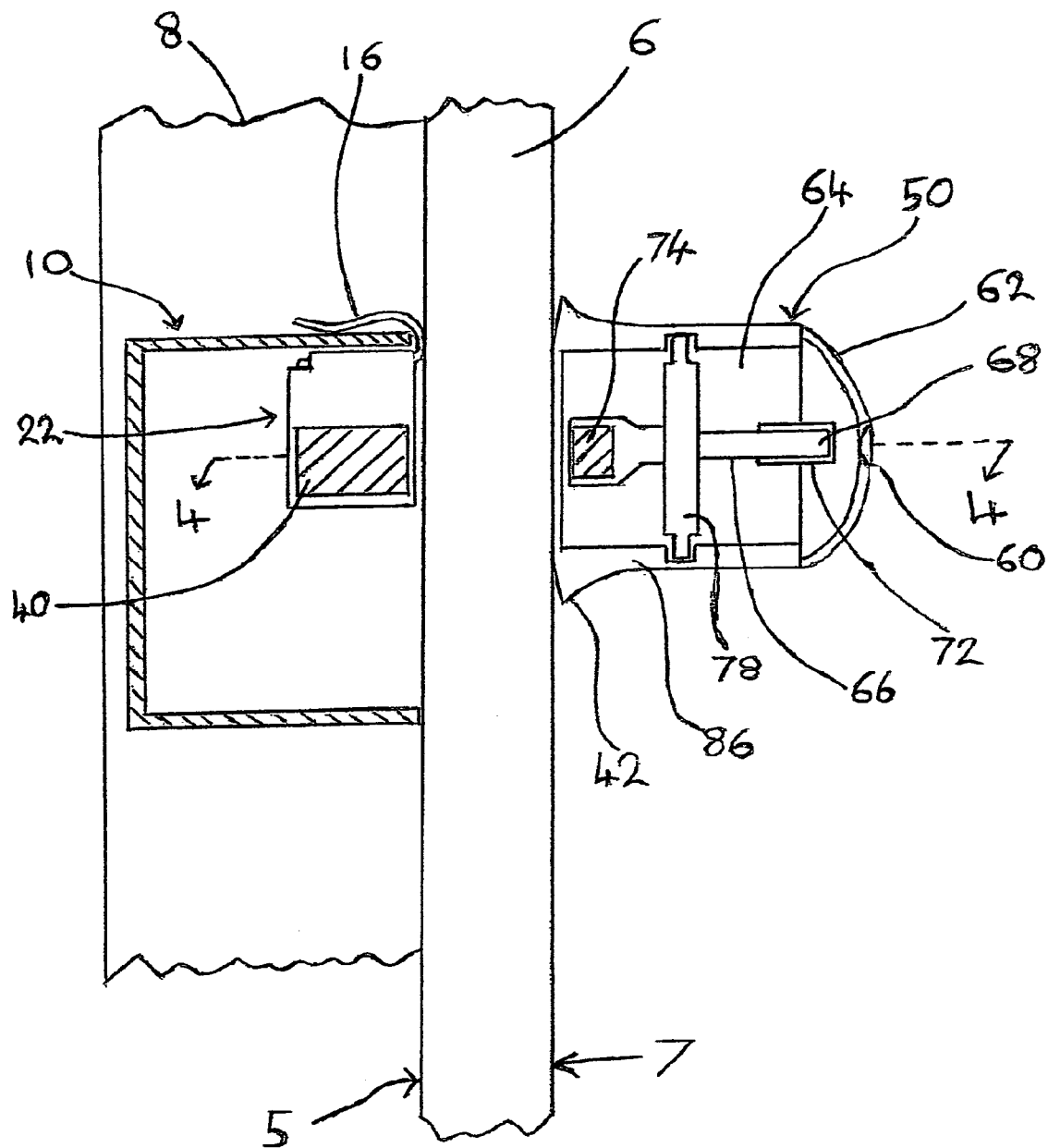

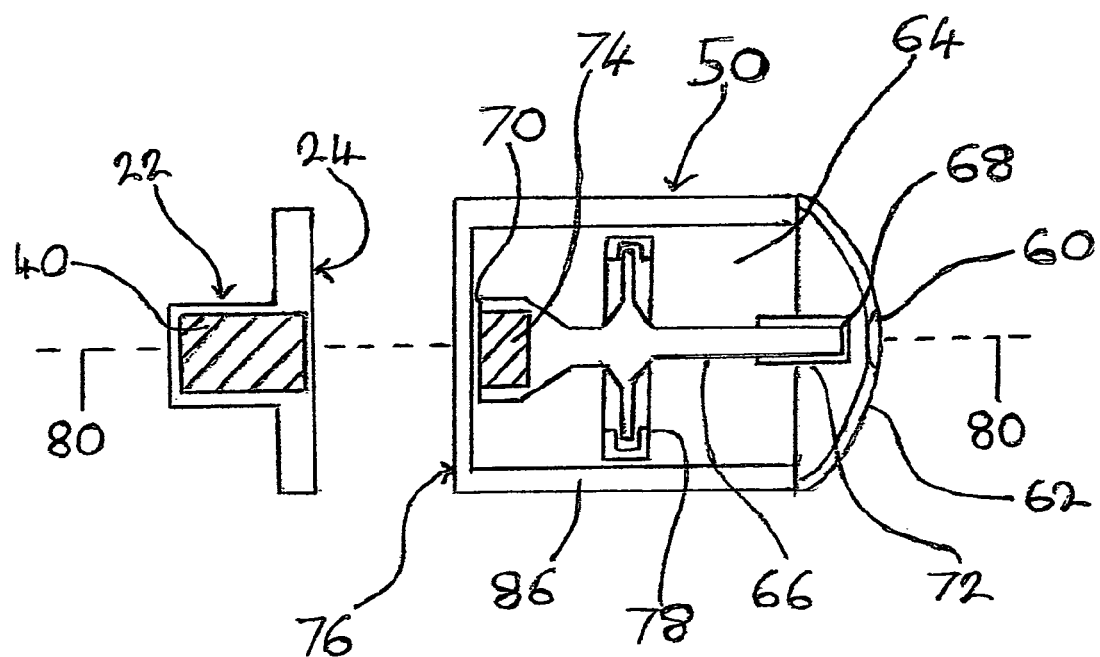

JUNCTION BOX LOCATOR

The present invention relates to locators in general and in particular to a method and apparatus for locating hidden utility outlets such as electrical boxes/air duct and lighting boxes after a wall covering such as gypsum board has been placed thereover.

CROSS-REFERANCE TO RELATED APPLICATIONS

Not Applicable

STATEMENT REGARDING FEDERALLY SPONSORED RESEARCH OR DEVELOPMENT

Not Applicable

REFERANCE TO SEQUENCE LISTING

Not Applicable

BACKGROUND OF THE INVENTION

In the field of construction it is frequently necessary to install junction boxes for electrical outlets/light switches/power points and the like. Such junction boxes are frequently located within a wall and may be attached to a wall stud or to the rear surface of the finishing panel. In such construction where the wall is to be finished with a sheeting material such as gypsum board, it is necessary to cut a hole in the gypsum board so as that the interior of the junction box may be accessed so as to install light switches/power points and the like therein thereafter the junction box may be covered with a cover plate as are commonly known.

Present difficulties exist in determining the location of junction boxes and the like behind a sheet of gypsum board also in determining the correct entry point for the cutting tool. These difficulties are typically presented during construction when the gypsum board is installed over the top of the junction boxes and the like. Inaccurate measuring and marking of the junction boxes can result in the holes being cut too big or in the wrong position and not corresponding to the junction box location resulting in the loss of time and money.

Previous attempts to solve these difficulties have located a magnet within the junction box and have detected that magnet on the exterior surface of the wall. Such attempts however have not taken into account the affects of gravity and friction on the magnets causing inaccurate marking, an example of this would be as the thickness of the drywall increases the less accurate they would become. Examples of such may be shown in U.S. Pat. Nos. 7,367,131 Horids and 4,384,396 Smolik. Previous attempts also have limitations in respect to the shape being cut relates to the template that is being used if you required numerous shapes and sizes as in various different outlets you would require numerous different templates, the present invention requires no templates once an entry point has been marked a cutting tool is entered at that point piercing through the wall covering then the junction box itself what ever the size or shape is used to guide the cutting tool.

Conventional methods of locating the necessary hole would be to measure the location of the junction box on the wall and then transfer the said measurement onto the gypsum board giving the corresponding hole location, another method would be to use a drywall square which again requires taking and transferring measurements and allowing for human error.

BRIEF SUMMARY OF THE INVENTION

The present invention allows the gypsum board to be fitted direct onto the wall without taking any measurements of the junction boxes and the like that are to be covered over and hidden from sight, it permits this by pushing an insert, which is the first body of the apparatus into the outlet box before a wall covering is placed there over. The said insert being specific in shape and dimension which when in place holds a magnet that may be located. The second locating body of the apparatus can then be used to find the first body, the second locating body achieves this by aligning a locating pin with a position indicator viewable through a window at the top of the said apparatus, when alignment is correct the tool may be pivoted to one side onto the scribing point and an indent made upon the front surface of the gypsum board, pin pointing an accurate entry point for a cutting tool such as a router.

According to the first embodiment of the present invention there is disclosed an apparatus for locating junction boxes/air duct and the like within a wall, said wall having a covering thereover. The apparatus comprises a first insertable body locatable within the junction box and the like proximate a rear surface of the wall covering, said first insertable body having a magnet located therein and a second body locatable proximate a front surface of a wall covering opposite the first body. The second body comprises a scribing point which corresponds to the entry point for a cutting tool, the apparatus further comprising an elongate member having proximate and distall ends and being pivotally mounted to the second body permitting multi axial movement. The said elongate member has a second magnet at the proximate end thereof wherein the distal end may be aligned with an alignment indicator when the scribing point is aligned for marking the entry point for a cutting tool. The distal end of the elongate member comprises a balance weight to counteract the forces of gravity upon the proximate end.

The elongate member may have longitudinal length extending between said proximate and distal ends, said elongate member may be pivotal about a middle portion thereof. The elongate member may be pivotal about its center of mass. The elongate member may pivotally supported by a mounting carrier. The mounting carrier may be pivotally mounted to the second locating body of the apparatus.

Other aspects and features of the present invention will become apparent to those ordinarily skilled in the art upon the review of the following description of specific embodiments of the invention in conjunction with the accompanying figures.

BRIEF DESCRIPTION OF DRAWINGS

In drawings which illustrate embodiments of the invention wherein similar characters of reference denote corresponding parts in each view, FIG. 1 is a perspective view of an apparatus for locating junction boxes within a wall according to the first embodiment of the invention.

FIG. 2 is a perspective view of the insert being installed within a junction box.

FIG. 3 is a cross sectional view of the apparatus of FIG. 1 as taken along the line 3-3 in operation while locating a junction box.

FIG. 4 is a cross sectional view of the apparatus of FIG. 1 taken along the line 4-4 of FIG. 3.

DETAILED DESCRIPTION

Referring to FIG. 1 an apparatus according to a first embodiment of the invention shown generally at 20. The apparatus 20 comprises a first body or junction box insert body 22 and a second body or locating body 50 alignable with the first body. As illustrated in FIG. 2 the junction box 10 may be secured to a wall stud 8. It will also be appreciated that the said junction box may be secured to any other wall member as is commonly known in the art. The junction box 10 includes a peripheral wall 12 defining a central cavity 14. As illustrated in FIG. 3 a wall panel 6 may be secured over the junction box 10 and wall stud 8. The wall panel 6 has a front surface 7 and a back surface 5. The insert body 22 comprises a front surface 24 adapted to lay flat against a surface and peripheral edge 26 corresponding to the cavity 14 of the junction box into which it is to be fitted. The peripheral edge 26 may be defined by the top and bottom surfaces 30 and 32 respectively and first and second sides 34 and 36 respectively. The insert body 22 also includes a clip 16 adjacent side 34. The clip 16 protrudes from front surface 24 and continues down first side 34 where the end finishes with a protruding bevel 38. The said clip is the preferred method of securing the insert body 22 onto the peripheral wall 12 of junction box 10 within cavity 14. It will also be appreciated that clip 16 of the said insert body 22 may be either permanently fixed or removable from the insert body 22.

The insert body 22 comprises a first magnet 40 located therein for cooperation with the locating body as will be further discussed below. The first magnet 40 may be located adjacent to front surface 24 of the insert body or internally therein as illustrated in FIG. 4, it will also be appreciated that the insert body 22 may have any shape and outline necessary or desired so as long as the first magnet 40 is located at a constant predicable location for cooperation with the locating body 50 and to permit universal fitting into all outlets.

The locating body 50 comprises a body having a peripheral edge 52 as illustrated in FIG. 1, the locating body housing 86 being predominantly cylindrical in shape comprises scribing points 42 protruding from the said body adjacent to front surface 76. The said scribing points are used to mark an indent into surface 7 of wall board 6 when the magnets 40 and 74 are aligned and the distal end 68 of the elongate member 66 is aligned with the alignment indicator 60. The elongate member extends between distal and proximate ends 68 and 70 respectively and includes a balance weight 72 mounted onto the distal end of the said elongate member. The balance weight 72 provides a means of counter balancing magnet 74 inserted into proximate end 70. When equilibrium is achieved of the elongate member the magnet 74 can operate more efficiently. The said balance weight 72 should be noted as being a crucial part of the apparatus and different from any other related prior art.

According to the first embodiment of the present invention the indicator 60 comprises an opening or transparent window through which an alignment arm is visible when locating body 50 has been positioned directly over the insert body within the junction box. In other embodiments it will be appreciated that the locating body may be formed of a substantially transparent body wherein the indicator 60 comprises a demarked boundary within the body such as by way of a differently coloured circle or the like. Although the indicator 60 is shown as a circle in the attached figures it will be appreciated that other shapes may be useful as well to define an area corresponding to when the locating body 50 is properly aligned with the junction box.

Turning now to FIG. 3 a cross sectional view of the insert body 22 within a junction box 10 and a locating body 50 in operation for locating the junction box 10 are shown. As shown in FIG. 3 the locating body 50 comprises a cavity 64 therein containing an elongate member 66 which is pivotally supported therein. It will be appreciated that although the cavity 64 is illustrated as being enclosed it may also be open on one or more sides to permit access to the elongate member 66. With the elongate member being balanced it permits magnet 74 to work free from the effects of gravity and brings greater accuracy to the apparatus. Balance weight 72 may have a colour or other surface treatment to allow easy viewing through indicator 60.

The elongate member 66 is pivotally mounted onto an annular shaped carrier 78 as shown in FIG. 4 and the annular shaped carrier 78 in turn is pivotally mounted at an axis oriented perpendicular to the afore mentioned pivot points onto the said locating body housing 86 shown in FIG. 3. This configuration permits the elongate member 66 to pivot about both horizontal and vertical axes. It will be appreciated that cavity 64 of the locating body 50 should be large enough that there is sufficient tolerance to permit the elongate member 66 to freely rotate about a wide range of angles of both horizontal and vertical axes so as to permit the elongate member 66 to indicate that it is either above/below/left or right of first magnet 40.

The locating body 50 comprises a viewing window 62 where centrally located therein is an alignment indicator 60. The said viewing window 62 shall be transparent other than the alignment indicator 60. The viewing window 62 shall be hemispherical in shape so as to run parallel to the swing of distal end 68 of the elongate member 66. The above configuration will permit the user to clearly see the distal 68 at all orientations of the elongate member 66 by maintaining a constant distance between distal end 68 and the said viewing window 62. The distal end 68 and viewing window 62 shall be equidistant throughout all angles of swing. It shall also be appreciated that the distance between distal end 68 and viewing window 62 shall be but not limited to being equidistant.

As illustrated in FIG. 4 the locating body 50 has a front surface 76 adapted to engage and lay flat against a front surface 7 of wall panel 6. In such a position the locating body may be moved along the front surface 7 until the second magnet 74 becomes attracted to the first magnet 40. The magnetic attraction between the first and second magnet will force the elongate member 66 to orientate towards the first magnet 40. With second magnet 74 closest to the first magnet 40 the user may then move the locating body 50 until the distal end 68 is viewable through the indicator 60, the locating body 50 is then pivoted on one side permitting the scribing point 42 to make an indent upon surface 7 of the wall board marking an accurate entry point for a cutting tool.

The indicator 60 is positioned on the viewing window 62 at a position such that the proximate end 68 is viewable there through when an axis 80 of the elongate member 66 is substantially perpendicular to the front surface 7 of the wall panel 6. In such an orientation the axis 80 of the elongate member 66 passes through the first magnet 40 and the indicator 60 so as to indicate that the indicator is substantially in alignment with the first magnet. The position of the first magnet 40 within the first insert body 22 is selected that in such an orientation the scribing points 42 of the locating body 50 corresponds to the entry point for a cutting tool.

In operation a user may locate the insert body 22 within with a junction box 10 to be located. Thereafter a wall panel 6 may be temporarily or permanently located there over, a user may then utilize the locating body 50 to determine the location of the junction box 10. When the user has successfully aligned the distal end 68 of the elongate member 66 within the indicator 60 the user then may mark an entry point for a cutting tool such as a router and alike with the scribing points 42 and proceed to cut the wall panel 6. When cutting is complete and the cut piece of the wall panel is removed the insert body 22 may then be recovered and reused. It shall be appreciated that the tools design will permit the detection of outlets manufactured out of any known type of material.

Optionally the elongate member 66 may be replaceable with a magnetic sensor in the locating body 50 for determining the location of the first magnet 40. The magnetic sensor may provide an indication to a user of the distance to the first magnet 40 such that the user may move the locating body 50 until a minimum distance is indicated. Optionally a directional magnetic sensor such as but not limited to a vector magnetometer may be utilized when the sensed magnetic field of the first magnet 40 is perpendicular to the wall panel 6.

The insert body 22 and the locating body 50 may be formed of any suitable material such as by the way of non-limiting example plastic/woods/alloys and metals. The magnets used for the present invention may be of any known type such as by way of non-limiting example/ferrite/neodymium/cobalt or ceramic.

It will be appreciated that strong magnets will be preferable for use as for the first magnet 40 and the second magnet 74 so as to assist in accurate alignment of the elongate member 66 with the first magnet 40.

While specific embodiments of the invention have been described and illustrated such embodiments should be considered illustrative of the invention only and not limiting the invention as construed in accordance with the above description.

I claim:

1. A locating tool comprising a first and second body, the first body can be inserted into a utility outlet before a wall covering is placed there over and the second body can be used to detect the exact position of said first body, magnets are located within the first body that attract a magnet located within the second body, the second body comprises an elongate member that is pivotally mounted within a subassembly to permit a 360 degree swing of the distal end of the elongate member, the elongate member comprises a magnet at the proximate end and a balance weight at the distal end to compensate for the effect of gravity upon the proximate end, the second body comprises a viewing window through which the distal end of the elongate member can be seen, when the first and second body's are perfectly aligned the distal end of the elongate member will be centred within an alignment indicator on said viewing window, the second body comprises scribing points which permit the marking of an entry point for a cutting tool.

2. The locating tool of claim 1 wherein the first body comprises a retaining clip that is removable from the first body allowing easy replacement of the said retaining clip.

3. The locating tool of claim 2 wherein the first body comprises the retaining clip permitting temporary attachment to a peripheral wall of a utility outlet.

4. The locating tool of claim 1 wherein the first body has a front surface adapted for placement against a wall covering.

5. The locating tool of claim 1 wherein the first body has specific shape and dimension to permit universal fitting into all residential and commercial utility outlets including vacuum and air outlets.

6. The locating tool of claim 1 wherein the second body comprises a front surface adapted for placement against a wall covering.

7. The locating tool of claim 1 wherein the second body comprises the subassembly permitting multi axial swing which upon detection of the first body orientates the elongate member from a distance towards the direction of said first body within the utility outlet.

8. The locating tool of claim 1 wherein the second body comprises the scribing points protruding from the side wall of the housing adjacent the front surface, by pivoting the said body onto the scribing points an indent can be marked into the covering surface.

9. The locating tool of claim 1 wherein the second body comprises the subassembly that is pivotally mounted at its centre of mass within the said body.

10. The locating tool of claim 1 wherein the second body comprises the elongate member that is pivotally mounted at its centre of mass within the subassembly.

11. The locating tool of claim 1 wherein the second body comprises a system to compensate the affects of gravity on the proximate end of the elongate member, when the said body is placed against a vertical wall surface and rotated 360 degrees the system will maintain to compensate for the effect of gravity upon the proximate end of the elongate member through out the rotation.

12. The locating tool of claim 1 wherein the second body comprises the viewing window, said viewing window being hemispherical in shape and having the alignment indicator centrally located, the design of said viewing window permits the distal end of the elongate member to maintain a constant parallel position to the surface of the viewing window through out all swings of the elongate member.

* * * * *